(12) United States Patent
Wlodarczyk

(10) Patent No.: US 6,758,086 B2
(45) Date of Patent: Jul. 6, 2004

(54) AUTOMOTIVE CYLINDER PRESSURE SENSORS

(76) Inventor: Marek T. Wlodarczyk, 6865 Vachon Dr., Bloomfield Hills, MI (US) 48301

( * ) Notice: Subject to any disclaimer, the term of this patent is extended or adjusted under 35 U.S.C. 154(b) by 152 days.

(21) Appl. No.: 10/167,274

(22) Filed: Jun. 10, 2002

(65) Prior Publication Data

US 2003/0047004 A1 Mar. 13, 2003

Related U.S. Application Data

(60) Provisional application No. 60/297,186, filed on Jun. 8, 2001.

(51) Int. Cl.[7] .............................................. G01M 15/00
(52) U.S. Cl. ..................... 73/117.3; 73/118.1; 73/715; 250/231.1; 250/231.19
(58) Field of Search ........................... 73/118.1, 119 A, 73/117.3, 700–756; 250/231.1, 231.19

(56) References Cited

U.S. PATENT DOCUMENTS

| | | | | |
|---|---|---|---|---|
| 5,446,279 A | * | 8/1995 | Hsu ....................... | 250/227.21 |
| 5,693,936 A | * | 12/1997 | Komachiya et al. ... | 250/227.17 |
| 6,094,990 A | * | 8/2000 | Lykowski et al. ........... | 73/714 |
| 6,122,971 A | * | 9/2000 | Wlodarczyk ................ | 73/705 |

* cited by examiner

Primary Examiner—Edward Lefkowitz
Assistant Examiner—Jermaine Jenkins
(74) Attorney, Agent, or Firm—James M. Deimen

(57) ABSTRACT

Several associated techniques and fiber optic constructions are disclosed to protect a diaphragm type fiber optic cylinder pressure sensor from the effects of maximum under hood temperatures and to minimize errors associated with rapidly changing under hood and engine temperatures. The techniques include electronic compensation in response to temperature change, fuel system cooling of the optoelectronic interface, construction of the interface and construction of the sensor tip.

4 Claims, 6 Drawing Sheets

AUTOMOTIVE CYLINDER PRESSURE SENSORS

This application claims the benefit of provisional patent application No. 60/297,186, filed Jun. 8, 2001.

BACKGROUND OF THE INVENTION

The field of the invention pertains to internal combustion engines and, in particular, to fiber optic sensors for instantaneous cylinder pressure in operating engines.

An automatic cylinder pressure sensor mounted under the hood of a vehicle is exposed to widely fluctuating temperatures both in the transducer tip area as well as in the sensor signal conditioner location. Current signal conditioner specifications require operation at −40° C. to up to 120–150° C., depending on conditioner mounting location, while the transducer tip temperature is specified in the range of −40° C. to 300–350° C. During normal continuous engine operation the transducer temperature is typically in the 150–250° C. range. During a cold engine start the transducer temperature change from −40° C. to its operating temperature occurs in a matter of several seconds.

During a vehicle lifetime, under hood temperatures over 125° C. occur relatively rarely and in special situations such as prolonged driving at maximum load (e.g., up hill towing) or in a hot climate (e.g., Arizona). In addition, the maximum temperature varies significantly depending on under hood location. Mounting near engine exhaust ports may expose a sensor signal conditioner to radiant heat in addition to ambient temperatures, whereas, in contrast locating a sensor signal conditioner near an air intake may reduce peak temperatures by as much as 20–30° C.

Unless protected and compensated, temperatures over 125° C. may result in the failure of an LED light source in the sensor signal conditioner for the fiber optic sensor. While a maximum LED storage temperature is typically 150° C., the maximum operating temperature must be lower so that the LED p-n junction temperature does not exceed 150° C. Typically, the LED current heats the junction leading to a differential between ambient and junction temperature of 10–20° C. When an LED junction reaches 150° C. rapidly growing defects result in output power reduction and potential LED failure. While in some applications an LED can be thermoelectrically cooled, in high volume automotive use the cost constraints prohibit use of any such cooling devices.

SUMMARY OF THE INVENTION

This invention comprises several associated techniques intended to protect a diaphragm type fiber optic cylinder pressure sensor from the effects of maximum under hood temperatures and to minimize errors associated with rapidly changing under hood and engine temperatures. In particular, the invention:(i) reduces maximum LED temperature by attaching the sensor signal conditioner to a fuel line; (ii) limits LED junction temperature to less than 150° C. through "intelligent" management of LED current based on under hood temperature; (iii) minimizes errors associated with sensor temperature changes occurring during the transition between cold engine cranking and engine firing; (iv) reduces temperature-related errors due to fluctuations in the coupling efficiency between optical fibers and the LED (or photodiode); and (v) minimizes the thermal shock error associated with rapidly varying cylinder gas temperatures.

The techniques include electronic compensation in response to temperature change, fuel system cooling of the optoelectronic interface, construction of the interface and construction of the sensor tip.

BRIEF DESCRIPTION OF THE DRAWINGS

FIG. 4AA is the optoelectronic module as assembled;

DESCRIPTION OF THE PREFERRED EMBODIMENTS

Figure 1A:
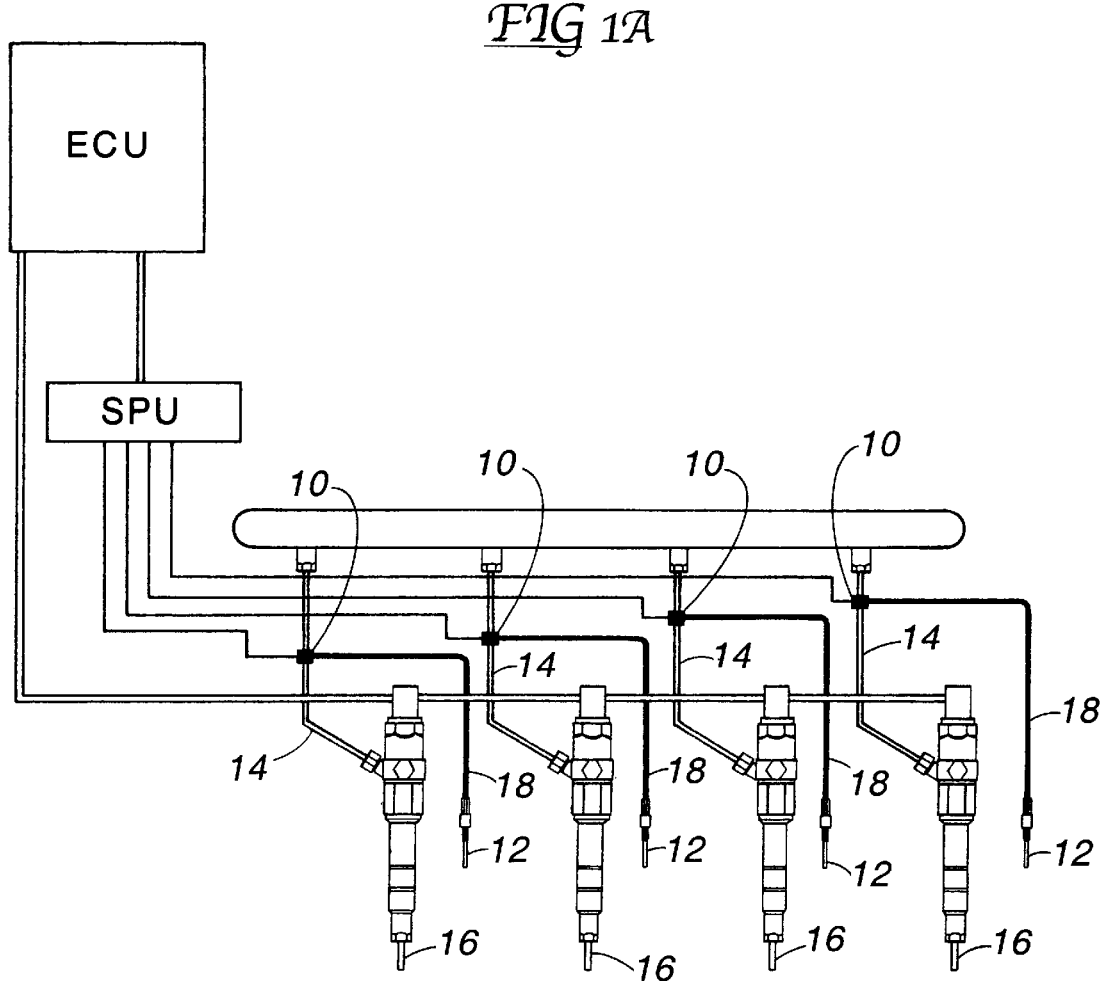
FIG. 1A is a schematic diagram of the fuel line mounted sensor signal conditioner.

In the first embodiment illustrated in FIG. 1 each sensor conditioner 10 of a fiber optic cylinder pressure sensor transducer 12 is attached to the injection system fuel lines 14 leading to the fuel injectors 16. Modem cars almost exclusively use fuel injection systems in which fuel is delivered individually to each engine cylinder and injected either into an intake manifold or directly into a cylinder. During engine operation the fuel line temperature is relatively low (about ambient) and constant due to the flow of gasoline or diesel fuel from the fuel tank. Since each sensor signal conditioner 10 is spaced from the corresponding sensor transducer 12 by a fiber optic cable 18, the sensor conditioner can be advantageously specifically designed to attach to a fuel line 14.

Figure 1B:
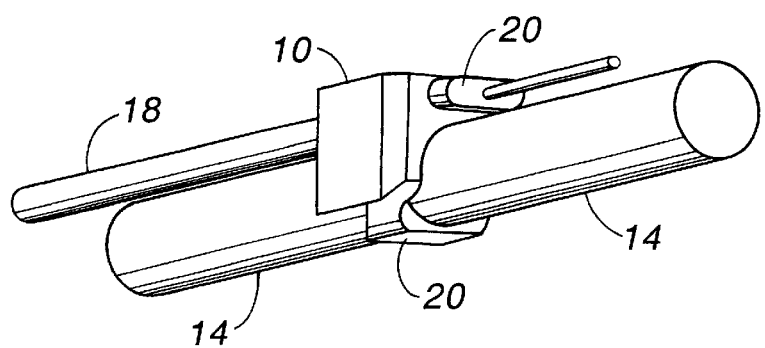
FIG. 1B is a perspective view of the fuel line mounted sensor signal conditioner.

As best shown in FIG. 1B each sensor signal conditioner 10 is tightly affixed to a corresponding fuel line 14 by a high thermal conductivity liner 20. When constructed with a good thermal connection between the sensor signal conditioner 10 and the fuel line 14, the LED and other optoelectronics in the conditioner can be maintained below 150° C.

Figure 2:
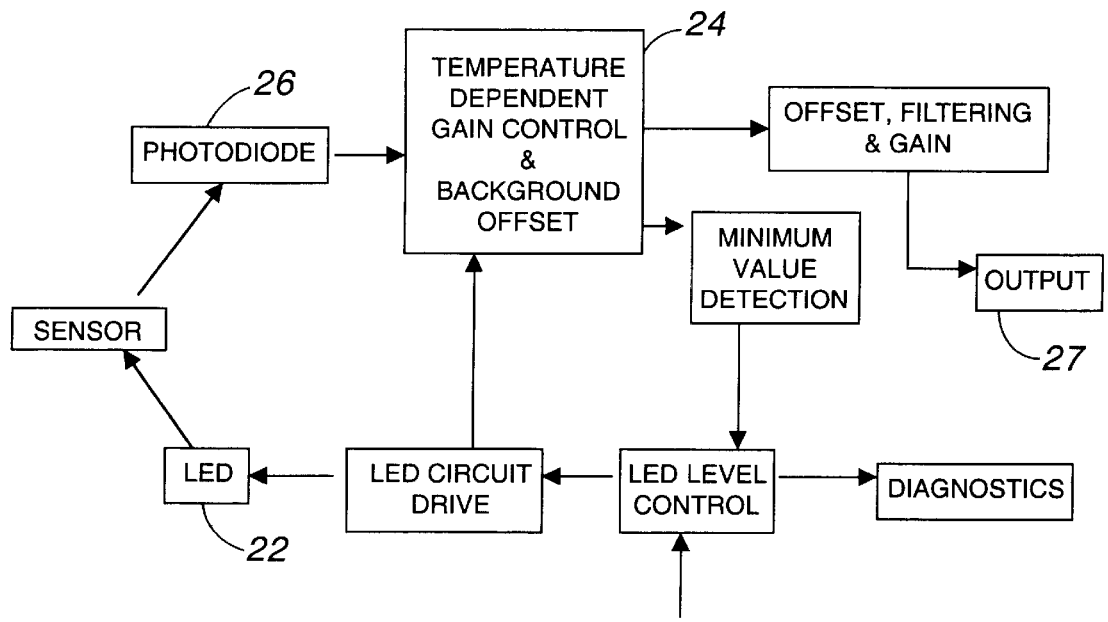
FIG. 2 is a schematic diagram of the auto-referencing technique having temperature dependant gain control.

In the second embodiment, schematically illustrated in FIG. 2, the LED 22 current is gradually reduced when the sensor signal conditioner 10 temperature exceeds 110° C., whereby the LED temperature never exceeds 150° C. In a normal mode of operation, for temperatures from −40° C. to 110° C., the LED current is adjusted by the auto referencing circuitry in FIG. 2 without any reference to temperature dependant gain control in block 24.

In the "peak temperature" mode, when the LED temperature exceeds 110° C., the LED current reduction with temperature is activated in response to the output of a thermistor integrated with the photodiode 26 amplifier circuit. The amplifier gain is automatically increased with increasing temperature thereby reducing the LED 22 current. The LED 22 current reduction is realized by the auto referencing circuit which in response forces the minimum sensor output voltage to 0.5 V, as in the 0.5 V normal operational mode. When the LED 22 temperature exceeds 140° C., the LED current is turned off to protect the LED and the sensor output 27 is set to the fault value.

To reduce the total time an LED need be turned on, only sensors that are to detect firing strokes in cylinders are activated. During engine operation effective combustion occurs during the power strokes, therefore only in some but not all cylinders at any moment. For the firing cylinders the duration of sensor operation may be further restricted to only a fraction of the high pressure firing power stroke. Depending on the control strategy selected, cylinder pressure information may be only needed near Top Dead Center (PDC) and peak pressure, for instance. Thus, the LED operating time may be set by the engine crank angle value.

Figure 3:
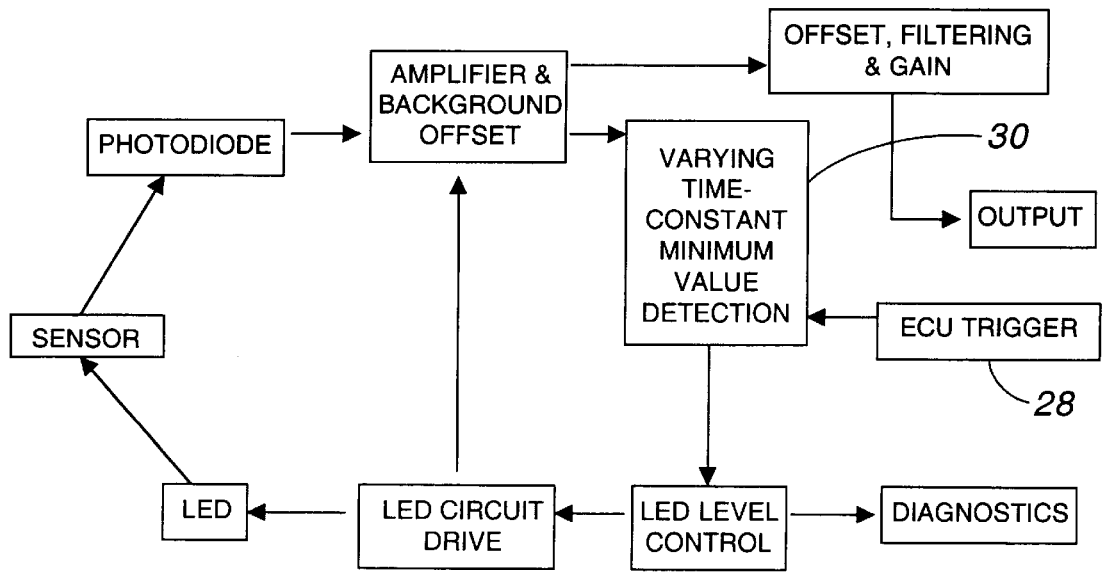
FIG. 3 is a schematic diagram of the auto-referencing technique having minimum detect circuitry of variable time constant.

In the embodiment of FIG. 3 a technique is aimed at providing accurate pressure information during engine cranking as well as during the transition from the motoring stage to the firing stage. In a cold climate the sensor transducers mounted in an engine head may be exposed to temperatures as low as −40° C. during the motoring stage. Immediately after the engine starts the sensor transducer temperatures will rise rapidly to 150°–200° C. due to the low thermal mass of the sensor transducers. In addition, as soon as each LED turns on it will self-heat resulting in a sensor output change, unless compensated for this temperature change effect.

In order to provide accurate operation during cranking-motoring stages as well as during the "cold start", the time constant of the minimum detector 30 circuitry is variable, as shown schematically in FIG. 3. Based on the trigger information provided by the engine electronic control unit (ECU) 28, after the ignition key is engaged, the time constant of the minimum detect circuitry 30 is reduced to an "initial" one millisecond (ms) from a "normal" one second, causing the sensor output to reach its minimum value of 0.5 V within the approximately 100 ms time period before the starter motor becomes engaged. Such a shortened time period is possible due to the absence of any dynamic pressure before engine motoring.

To provide accurate pressure reading during initial pressure cycles of a cold engine, when the sensor transducer temperature undergoes rapid changes, the time constant of the minimum detector 30 integrator is increased from the initial value of one ms to a number less than the nominal one second. This intermediate value is required to keep the minimum voltage as close as possible to the nominal 0.5 V required to maintain accurate sensor sensitivity. The duration of this "cold start" mode is dependant on the time constant of the sensor heating process, in turn dependant on the sensor package, sensor mounting location and engine operating conditions. The engine ECU 28 triggers the switch from the "intermediate" time constant to its "normal" value based on the time the engine has been firing or on the engine head temperature.

Another embodiment of this invention teaches the design of an optoelectronic module with a built-in alignment feature for thermally stable light coupling from an LED to an optical fiber. Typically, a receptacle is used to align an LED to a fiber using a precision sleeve concentric with the LED cavity. However, such an approach is prone to stacking of part tolerances, is not very stable under widely fluctuating temperatures and vibration, requires large and fairly expensive parts and does not provide for high efficiency coupling.

Figure 4A:
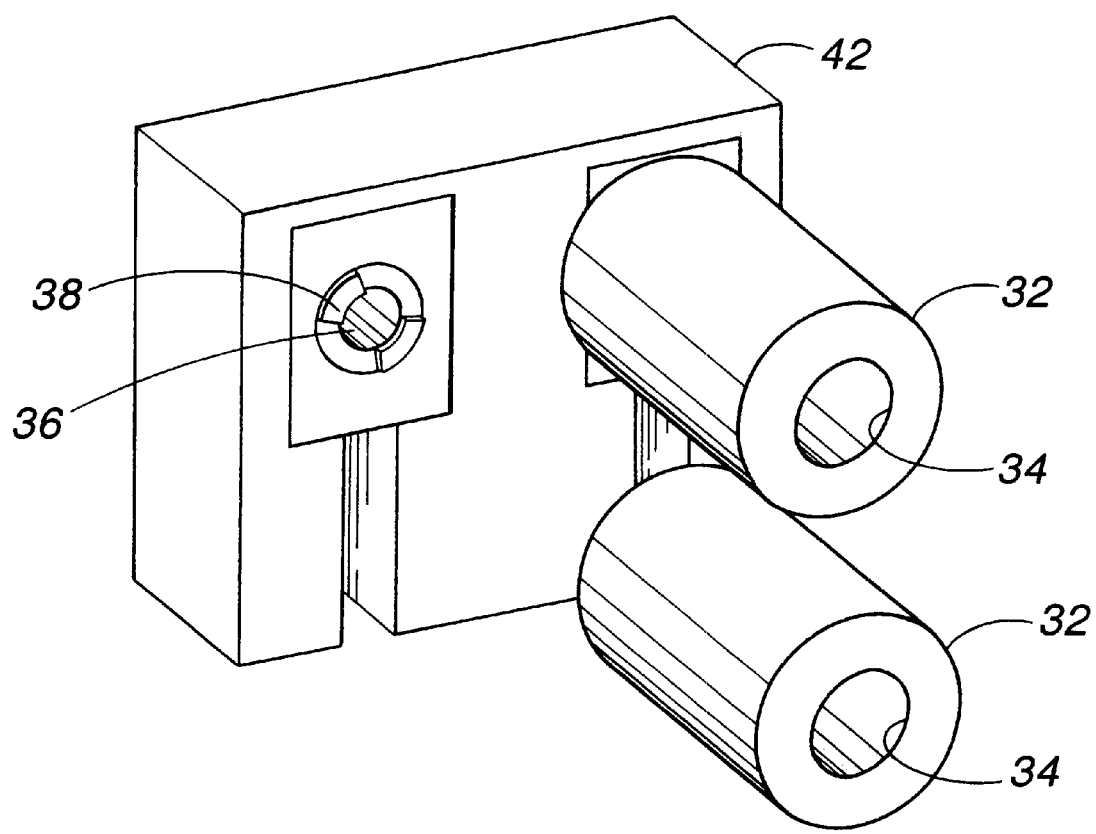
FIG. 4A is an exploded schematic diagram of the optoelectronic module with glass capillaries aligned internally.
Figure 4A:
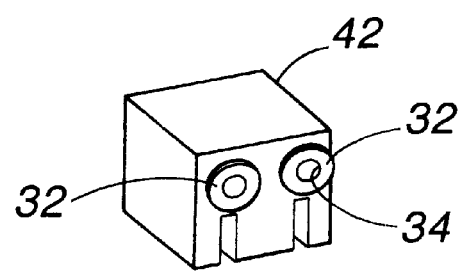

The present novel technique avoids intermediate parts but depends rather on direct contact between a fiber and an LED. For stable and high efficiency light coupling, an aligning structure or dome made of photoresist and a miniature glass capillary tube 32 with precision inner hole 34 is placed around the LED active area 36, as shown in FIG. 4A. A similar alignment is done for the photodiode element adjacent to the LED.

Figure 4B:
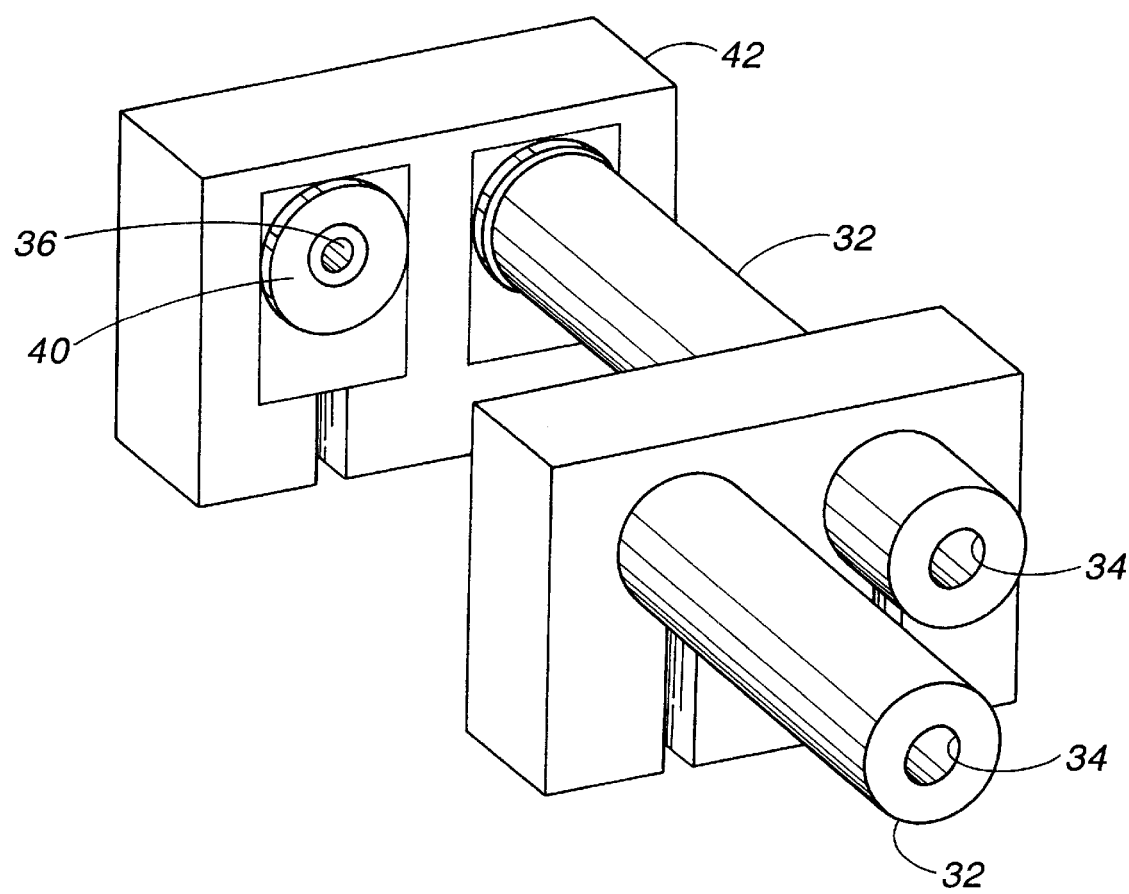
FIG. 4B is a schematic diagram of the optoelectronic module with glass capillaries aligned externally.

Alignment domes 38 in FIG. 4A or rings 40 in FIG. 4B are made of the photoresist deposited directly on the LED and photodiode dies 42 by a photolithographic technique during device manufacturing. Benefitting from the photo lithographic light tolerances of a few microns and the capillary 32 dimensional tolerances of the same order, the new alignment technique allows for high precision alignment of the capillary inner diameter 34, in which a fiber is to be placed, with respect to the emitting LED area 36 and similar collecting photodiode area of the optoelectronic device.

In addition, the new alignment technique allows for a precise and stable control of the distance between fibers, LED and photodiode. As temperature expands the optoelectronic module, the capillaries 32 stay lined up with the LED and photodiode emitting 36 and collecting areas resulting in stable light coupling efficiency and numerical aperture.

In order to reduce the amount of light reflection at the LED air-fiber interfaces, which would reduce the coupling efficiency, the area between fiber and LED is filled with silicone. Silicone protects the LED die 42 against temperature and humidity. During assembly a cleaved fiber end is first coated with a layer of silicone and then pressed into the capillary 32 inner diameter 34. The silicone fills any voids between fiber and LED die 42 providing the additional benefit of hermetically sealing the LED emitting area 36.

Figure 5A:
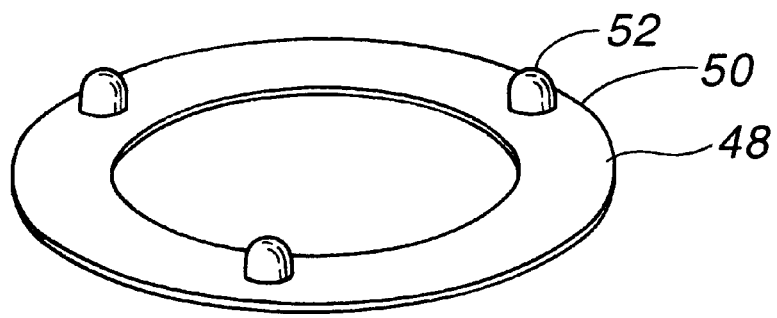
FIG. 5A illustrates a precision spacer in perspective.

Disclosed in FIG. 5 an embodiment of this invention teaches a technique for minimizing thermal shock error (associated with the high temperatures of combustion gases) and narrowing the thermal shock differential error from sensor to sensor. In a diaphragm type fiber optic pressure sensor as described here, the magnitude of the thermal shock error depends among other factors on the level of optical modulation. For a given sensor diaphragm size and fiber diameter and separation, this modulation depends on a relative distance from the fiber tips to the diaphragm. In order to minimize the thermal shock error and its variation from sensor to sensor, it is necessary to locate the sensor diaphragm 44 a precise distance from the fiber tips 46. Typically, the distance is set by laser welding based on the level of light reflected from the moving diaphragm. However, this technique does not allow for precision diaphragm positioning due to the effect of the laser welding.

Figure 5B:
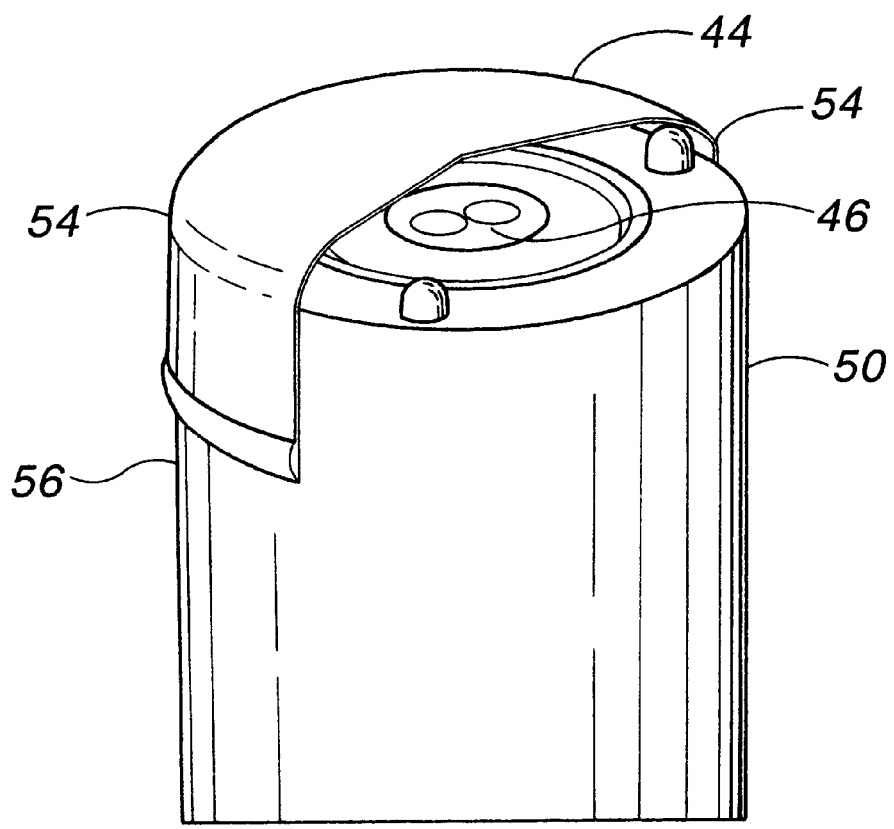
FIG. 5B illustrates in partially broken away perspective a sensor tip showing diaphragm, fiber ferrule and precision spacer.

In this embodiment, a precision spacer ring 48 on the surface of a flat polished fiber ferrule 50 allows for precise control of the distance between the fibers 46 and the diaphragm 44. The spacer stud cross-section has a trapezoidal shape such that its base 51 is wider than its top 52 in order to locate the contact point between the ring 48 and diaphragm 44 as close to the diaphragm maximum curvature 54 as possible. Such location in turn minimizes the effect of reduced diaphragm 44 deflection. In a preferred construction, the ring 48 is pressed into the diaphragm 44 and then the compound part is dropped on to the cylindrical ferrule 50 and laser welded in place at 56 as shown in FIG. 5B.

Figure 6:
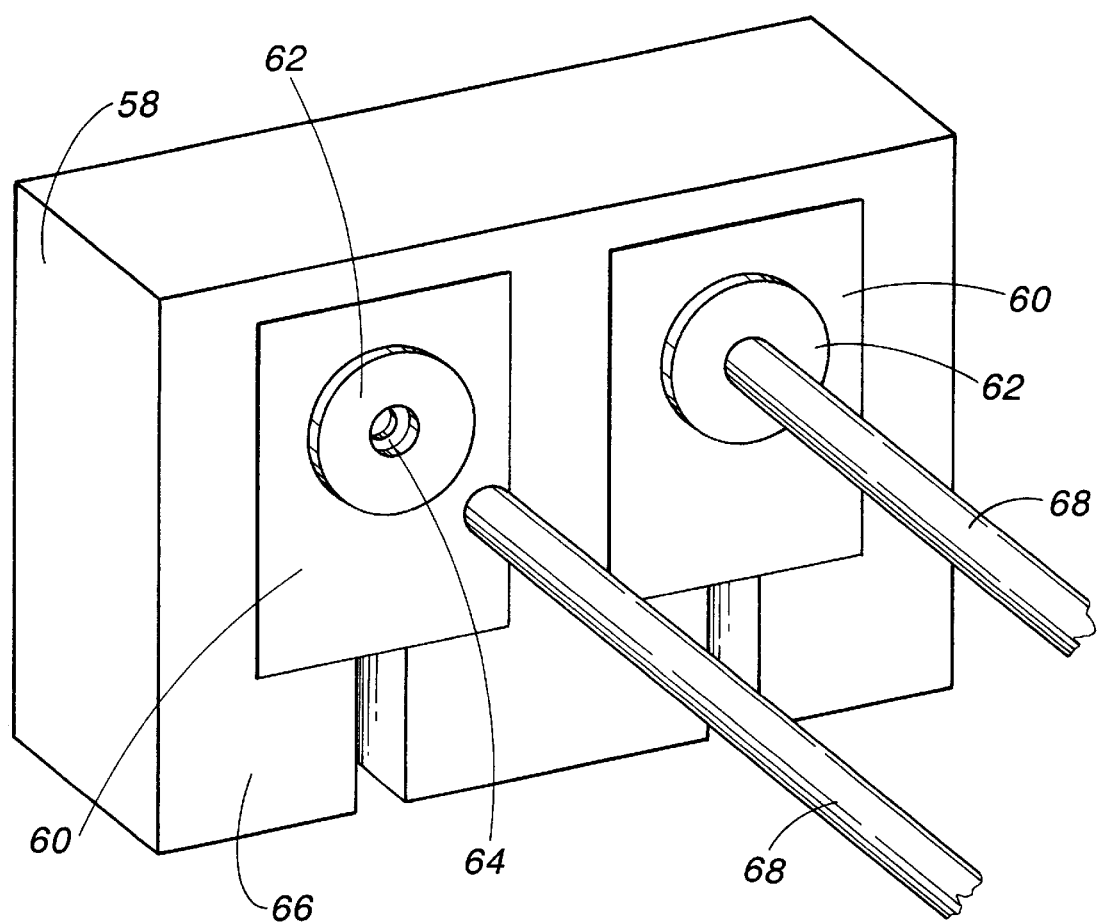
FIG. 6 is a schematic diagram of the optoelectronic module with a photoresist dome for fiberoptic alignment.

FIG. 6 illustrates an alternative LED and photodiode die or chip 58 having photoresist areas 60 each with a dome 62. The dome 62 is formed from photoresist with a hole 64 about 100 micron in diameter exposing the LED or photodiode surface. About the hole 64 is a 20 micron shoulder 66 of photoresist within the dome 62. The optical fiber 68 upon insertion as shown has the fiber core thereof exposed to the LED or photodiode surface, but the fiber cladding is blocked by the shoulder 66 from exposure.

What is claimed is:

1. A fiber optic diaphragm pressure sensor and optoelectronic signal conditioner comprising, a ferrule having at least one fiber optic cable tip contained therein, a diaphragm spaced from the tip and mounted on the ferrule, and an annular ring with studs spacing the diaphragm from the tip, a fiber optic cable leading from the tip to an optoelectronic signal conditioner, the optoelectronic signal conditioner being mountable on an engine fuel line, means on the optoelectronic signal conditioner to promote thermal conductivity with a fuel line and means to interface electronic control with the fiber optic cable, said means to interface including means to align the fiber optic cable in the interface means, and means in communication with the optoelectronic signal conditioner to provide temperature dependent gain control and variable time constant minimum detect circuitry.

2. The fiber optic diaphragm pressure sensor and optoelectronic signal conditioner of claim 1 wherein the means on the optoelectronic signal conditioner to promote thermal conductivity comprise a high thermal conductivity liner tightly fitted between the optoelectronic signal conditioner and a fuel line.

3. The fiber optic diaphragm pressure sensor and optoelectronic signal conditioner of claim 1 wherein the means to align the fiber optic cable in the interface means comprise a photoresist dome having a hole there through for insertion of the fiber optic cable.

4. The fiber optic diaphragm pressure sensor and optoelectronic signal conditioner of claim 3 wherein the hole includes a shoulder formed therein.

* * * * *